US008893552B2

(12) United States Patent
Hanse

(10) Patent No.: US 8,893,552 B2
(45) Date of Patent: Nov. 25, 2014

(54) VIBRATION TABLE WITH CIRCULAR MOUNTING SURFACE

(75) Inventor: John K. Hanse, Allegan, MI (US)

(73) Assignee: Hanse Environmental, Inc., Allegan, MI (US)

(*) Notice: Subject to any disclaimer, the term of this patent is extended or adjusted under 35 U.S.C. 154(b) by 455 days.

(21) Appl. No.: 13/214,104

(22) Filed: Aug. 19, 2011

(65) Prior Publication Data

US 2013/0042691 A1    Feb. 21, 2013

(51) Int. Cl.
*G01M 7/06* (2006.01)
*G01M 7/02* (2006.01)

(52) U.S. Cl.
CPC ............... *G01M 7/027* (2013.01); *G01M 7/06* (2013.01)
USPC .......................................................... 73/663

(58) Field of Classification Search
CPC ................................ G01M 7/027; G01M 7/06
USPC .......................................................... 73/663
See application file for complete search history.

(56) References Cited

U.S. PATENT DOCUMENTS

| | | | |
|---|---|---|---|
| 3,241,358 A | 3/1966 | Booth et al. | |
| 3,288,192 A * | 11/1966 | Bollinger | 411/166 |
| 4,807,578 A | 2/1989 | Adams et al. | |
| 4,940,374 A * | 7/1990 | Gallagher | 411/120 |
| 5,083,463 A * | 1/1992 | Marshall et al. | 73/663 |
| 5,412,991 A | 5/1995 | Hobbs | |
| 5,435,533 A * | 7/1995 | Weinmann, Jr. | 269/228 |
| 5,594,177 A | 1/1997 | Hanse | |
| 5,804,732 A * | 9/1998 | Wetzel et al. | 73/663 |
| 6,220,100 B1 * | 4/2001 | Felkins et al. | 73/663 |
| 7,508,067 B2 * | 3/2009 | Arai et al. | 257/719 |
| 2009/0056457 A1 * | 3/2009 | Wetzel | 73/663 |
| 2009/0223298 A1 | 9/2009 | Hanse | |

* cited by examiner

Primary Examiner — John Chapman, Jr.
(74) Attorney, Agent, or Firm — Waters & Oppenhuizen PLC; John A. Waters

(57) ABSTRACT

A vibration table having an upper surface defining a plane and on which test products are mounted by bolts that engage spaced internally threaded openings in the upper surface. The vibration table has mounted vibrators for generating vibrations in x-, y- and z-axes lying in the plane of the upper surface. Variation in the magnitude of the vibrations generated in the x-, y- and z-axes over the surface of the table are minimized by providing an upper surface that is circular in the plane of the upper surface.

14 Claims, 9 Drawing Sheets

VIBRATION TABLE WITH CIRCULAR MOUNTING SURFACE

CROSS REFERENCE TO RELATED APPLICATION

Not Applicable

BACKGROUND OF THE INVENTION

Vibration tables are used primarily in connection with test fixtures designed to test products under vibrating conditions. The general construction of vibration tables is well known. Generally they include upper and lower plates separated by spacers, with a vibrator mounted on the bottom of the lower plate and a test product mounted on the top of the upper plate. Representative vibration tables are shown in Applicant's U.S. Pat. No. 5,594,177 (which is incorporated by reference) and U.S. Pat. No. 5,402,991.

An object in the design of a vibration table is to provide a table that transmits a high proportion of the vibration energy to the test product over a desired frequency range. In order to accomplish these goals, it is generally desirable to make the table as rigid as possible and yet as light as possible. Rigidity maximizes higher frequency and higher energy transmission and minimizes resonant frequencies at low frequency ranges, while a light weight table minimizes energy loss that results from the mass of a heavy table. To accomplish these goals, tables are frequently made with a hollow or semi-hollow core. In Applicant's U.S. Pat. No. 5,594,177, the table includes spaced upper and lower plates connected together at the periphery by edge spacers and having intermediate spacers interconnecting the plates at intermediate positions.

Another feature of vibration tables is that they are frequently used to test products in high and low temperature environments. Thus, an insulating sheet is often bonded to the top of the upper plate. A metal sheet formed of titanium or the like can be mounted on top of the insulation. A problem with the incorporation of insulation in a shaker table is that the insulation can have a dampening effect on vibration that reduces the energy transmitted by the vibration table and the frequency response of the table. Prior tables typically have been limited to transmission of forces of under about 70 Gs RMS, with the great majority of the force being transmitted in a frequency range of about 1000-3000 Hz. This issue was addressed by Applicant's U.S. Pat. No. 7,886,606, incorporated herein by reference.

A further issue that affects the use of vibration tables, and the consistency of results obtained, lies in the variability of vibrations from point to point over the surface of the table. In a table having a conventional square or rectangular upper surface, the vibration profile (i.e., the amplitude per frequency of the vibrations over a frequency range in each of the x-, y-, and z-axes) can vary up to 20% over the surface of the table (i.e., at various points in the x-y axis) due to resonance of the vibrations reflected and concentrated by the sides and corners of the upper surface.

An object of the present invention is to provide a lightweight table that has improved energy responsiveness and a broader frequency spectrum and provides a means for uniform vibration profiles over the surface of the table. Specifically, it is an object of the present invention to provide a vibration table demonstrating a vibration profile over the surface of the table having a variability of less than 5%, and preferably +/−3%.

SUMMARY OF THE INVENTION

In a vibration table having an upper surface defining a plane and on which test products are mounted by bolts that engage spaced internally threaded openings in the upper surface, the vibration table having mounted vibrators for generating vibrations in x-, y- and z-axes lying in the plane of the upper surface, an improvement for reducing a variation in magnitude of the vibrations generated in the x-, y- and z-axes over the surface of the table, wherein the upper surface is circular in the plane of the upper surface whereby variation in vibrations generated in the x-, y- and z-axes are minimized.

DETAILED DESCRIPTION OF INVENTION

Figure 1:
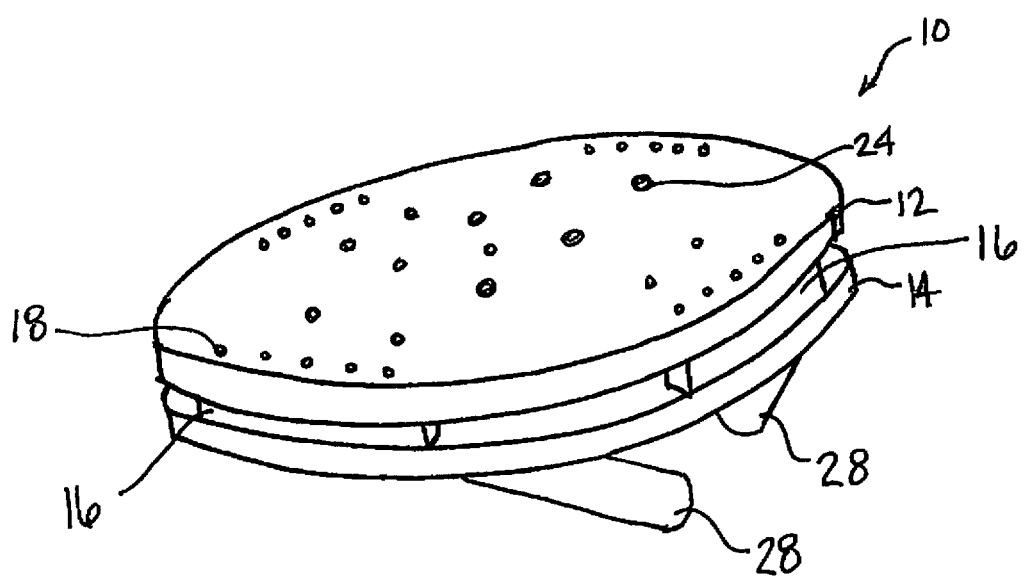
FIG. 1 is a perspective view of the improved vibration table with circular mounting surface of the present invention.
Figure 10:
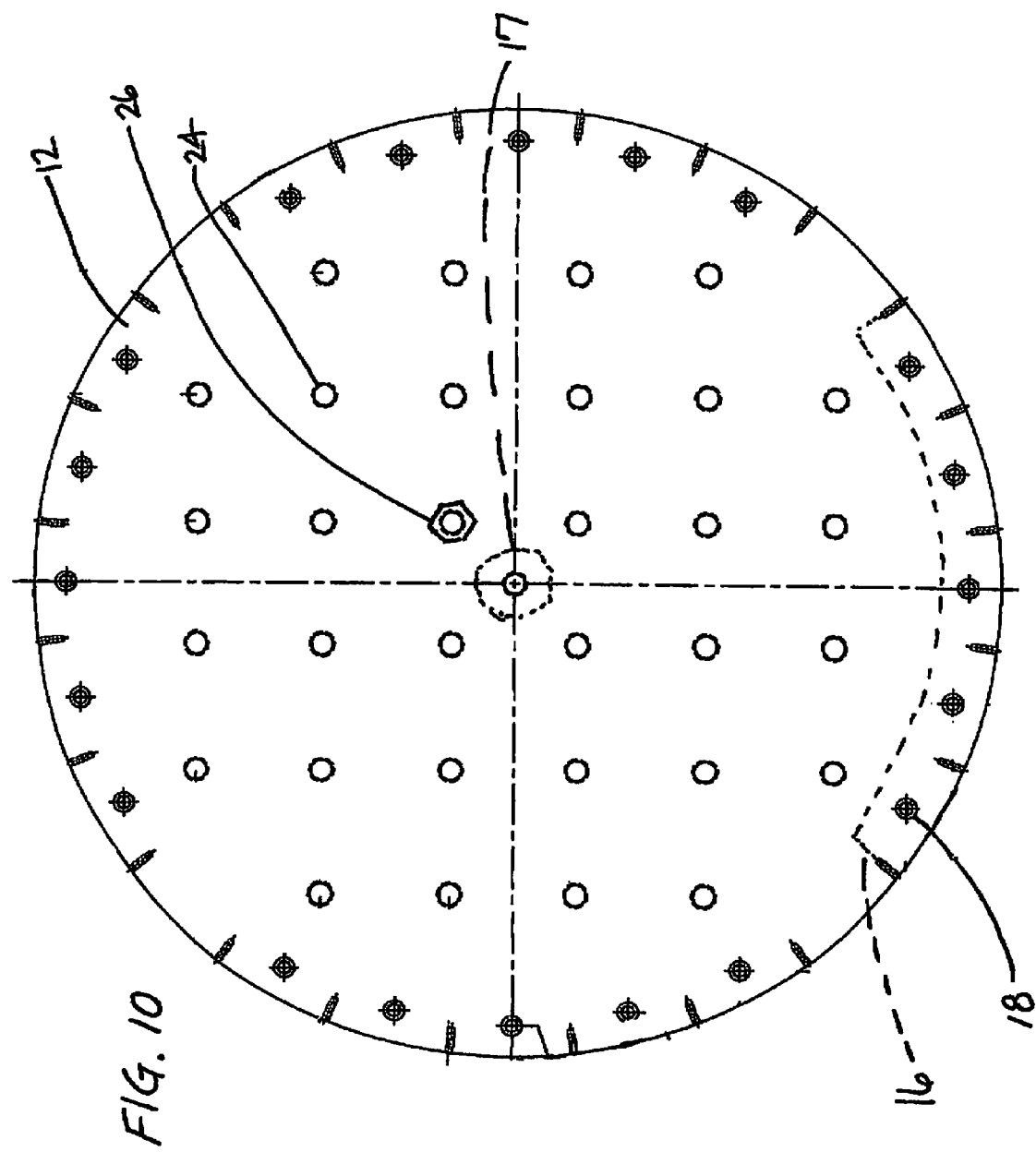
FIG. 10 is a top plan view of the vibration table with circular mounting surface of FIG. 1.

Referring now to the drawings, a shaker table 10 constructed in accordance with the present invention is shown in FIG. 1. Shaker table 10 includes an aluminum upper plate 12 (typically about one-half inch thick), lower plate 14, and edge spacers 16 separating the upper and lower plates. A center support 17 (FIG. 10) is secured in the center of the table surface between the upper and lower plates. Edge spacers 16 are attached to the upper and lower plates by bolts 18 and typically space the plates about one-half inch apart. Bolts 18 typically are ⅜ inch internal hex head stainless steel bolts that extend all the way through the upper and lower plates and edge spacers and are secured by nuts 19 on the lower ends. Lock washers are positioned adjacent the heads. These bolts are tightened to a torque of about 30-45 ft lbs for desired rigidity. The higher torque limit is determined by the bolt strength. The lower limit is significant for energy transmission. The G forces transmitted by the table drop off significantly when a lower torque setting is used.

Figure 1A:
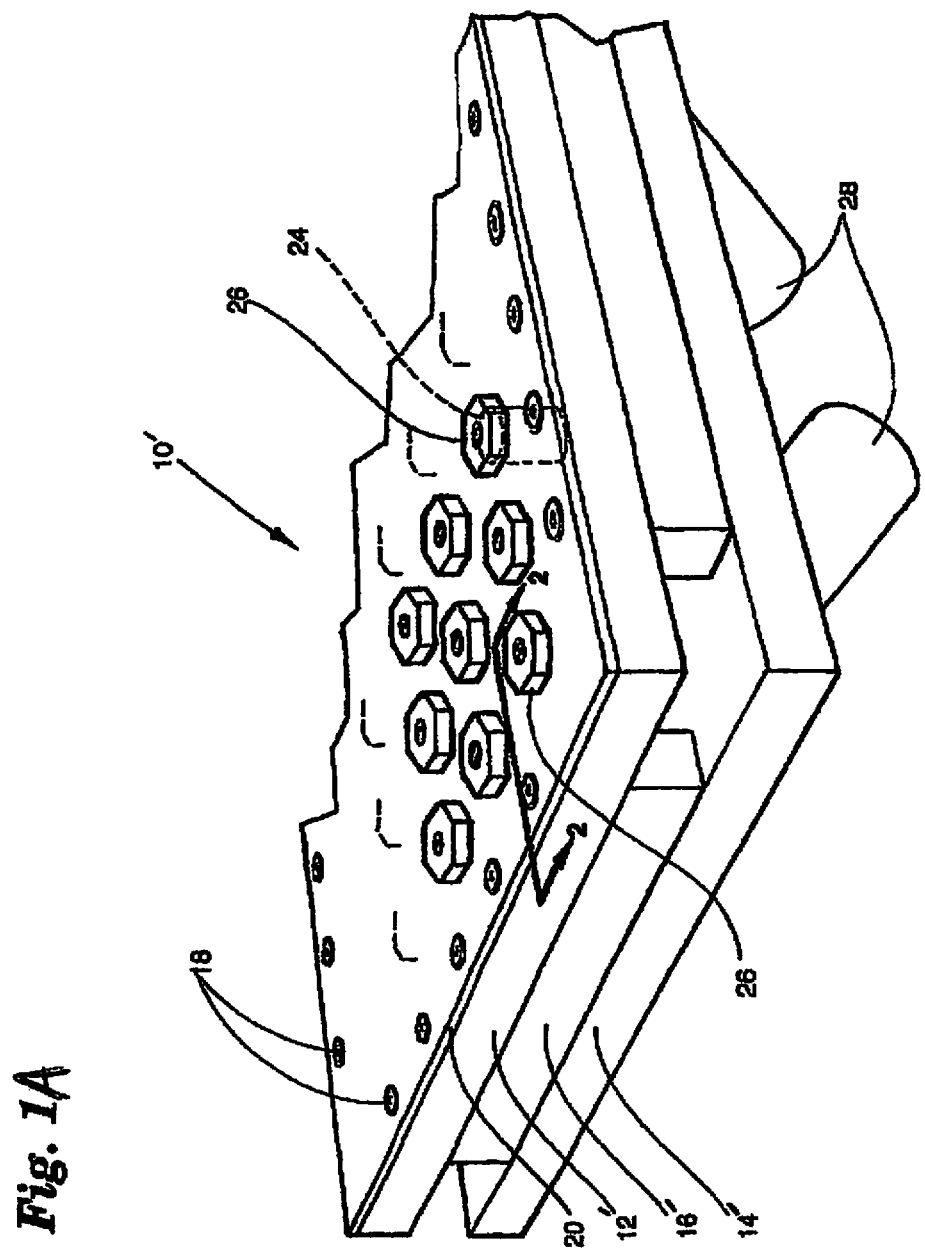
FIG. 1A is a perspective view of a vibration table having a squared surface and an insulating layer.
Figure 2:
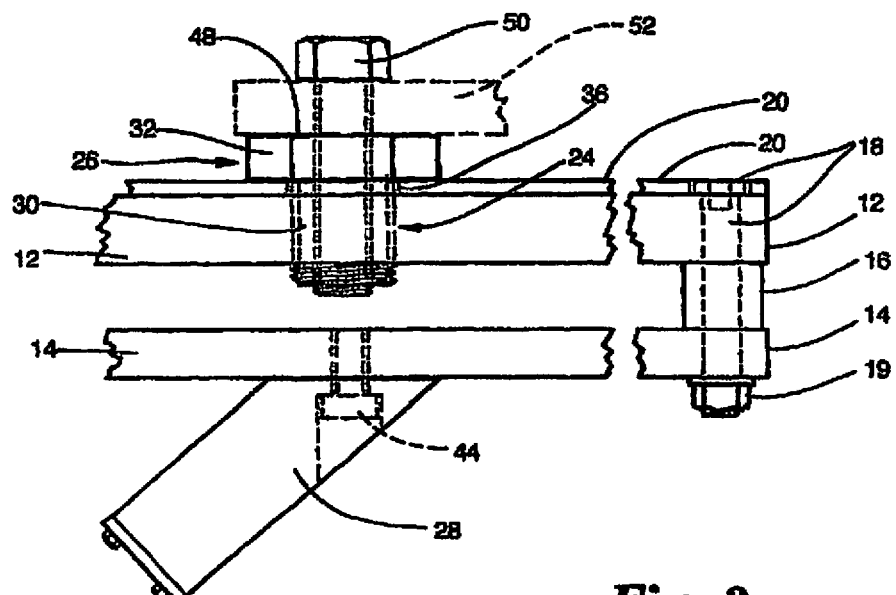
FIG. 2 is a fragmentary side elevational view taken along line 2-2 of FIG. 1A, showing the spacer mounted in a shaker table and with a test product mounted thereon.
Figure 3:
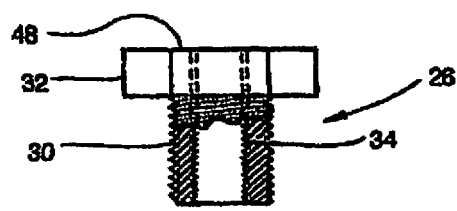
FIG. 3 is a plan view of an improved spacer of the present invention.
Figure 4:
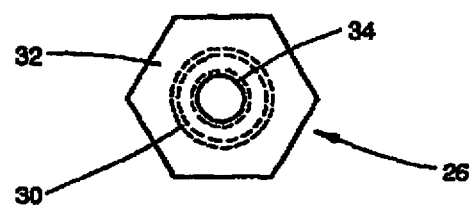
FIG. 4 is an end view of the spacer of FIG. 3.
Figure 5:
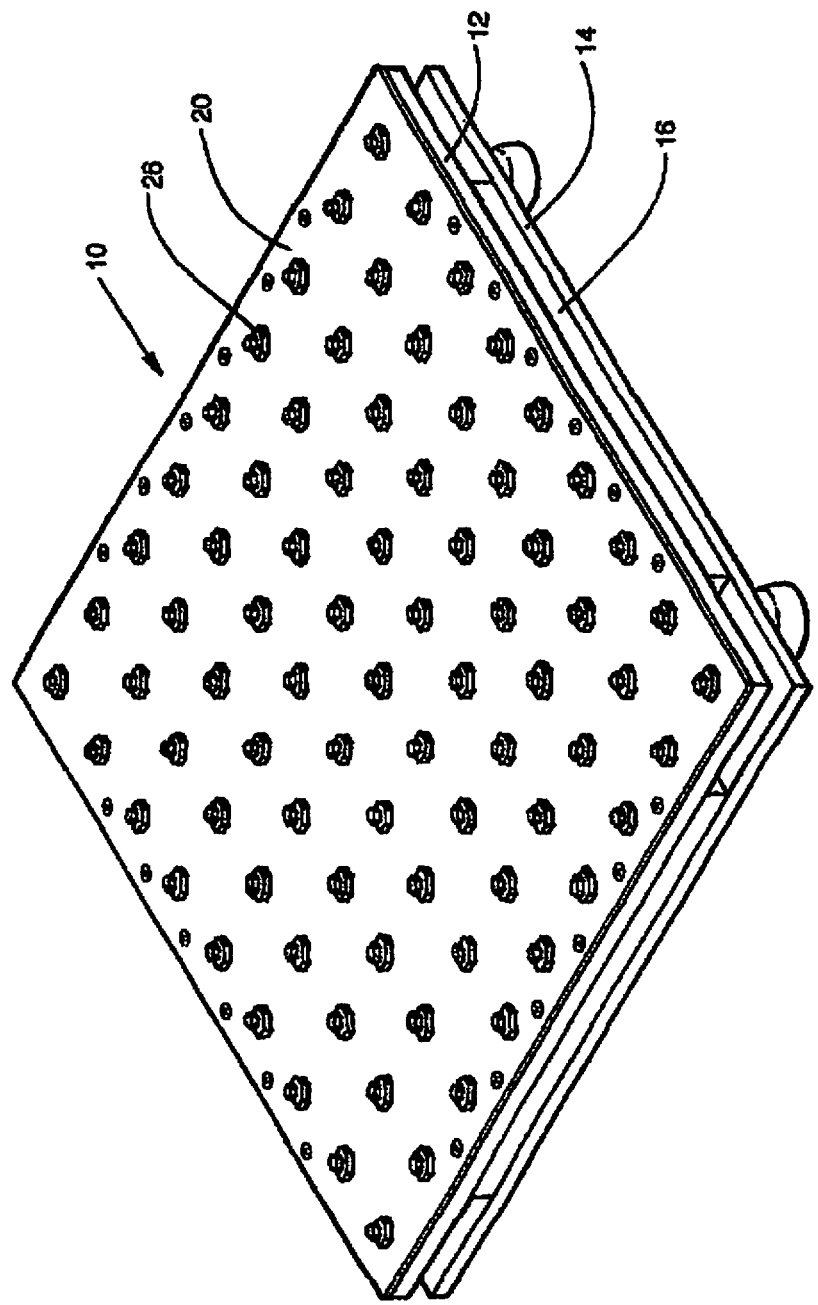
FIGS. 5 and 6 are perspective views of one embodiment of the present invention.
Figure 6:
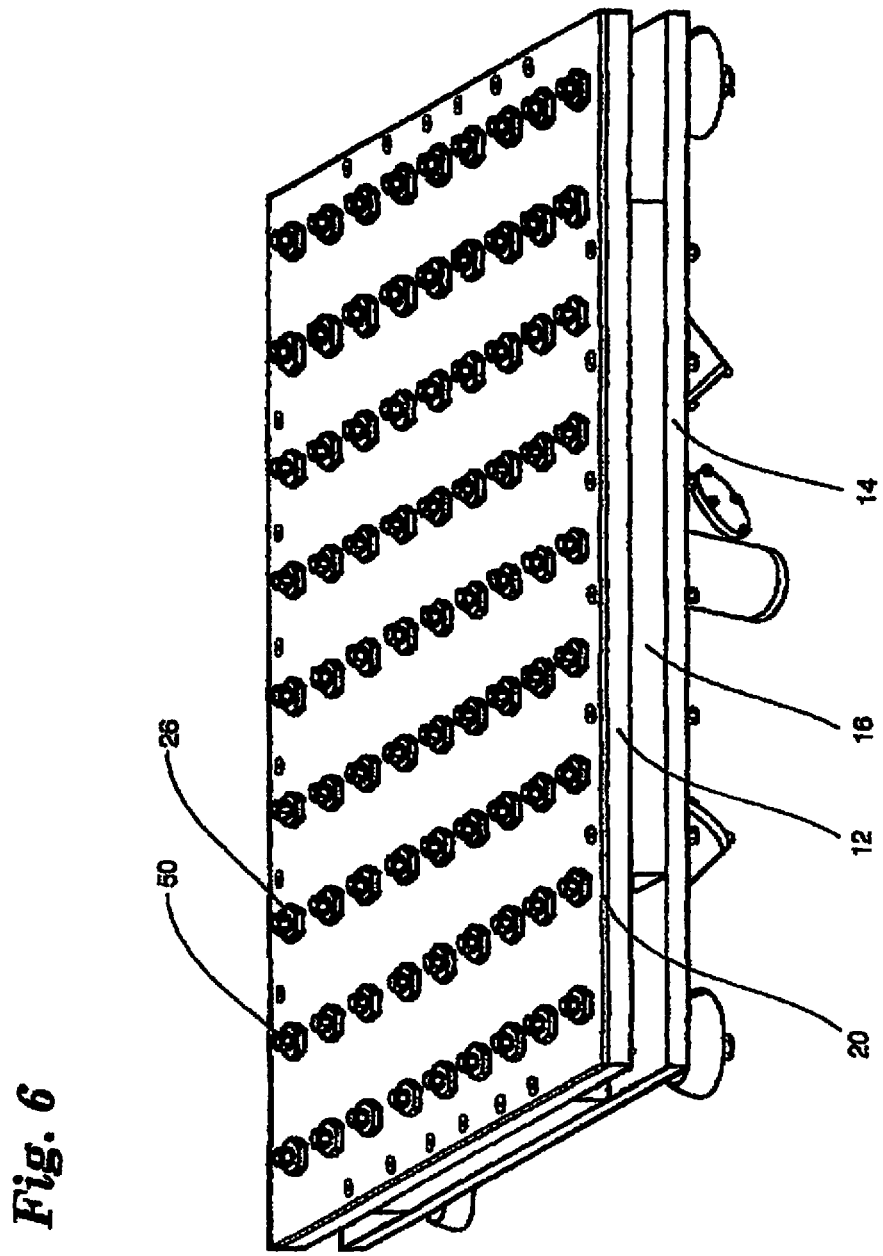
Figure 7:
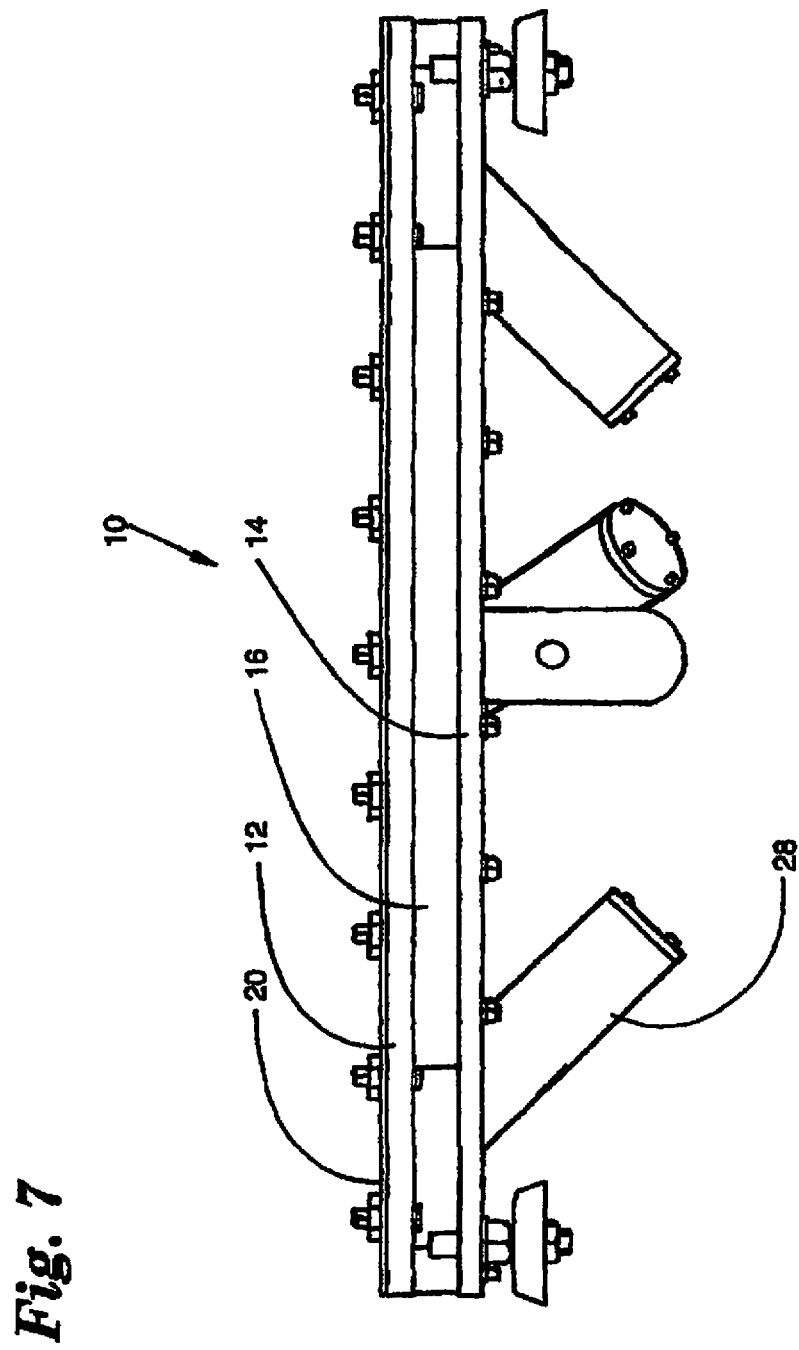
FIG. 7 is a side elevational view of the embodiment of FIGS. 5 and 6.
Figure 8:
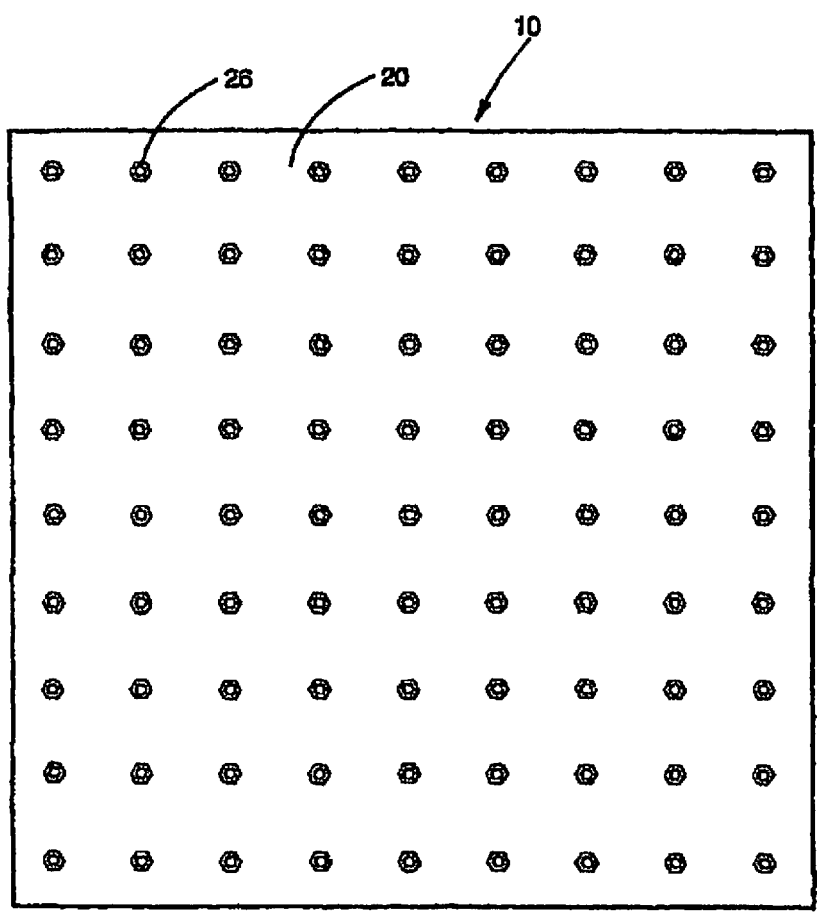
FIG. 8 is a top plan view of the embodiment of FIG. 7.
Figure 9:
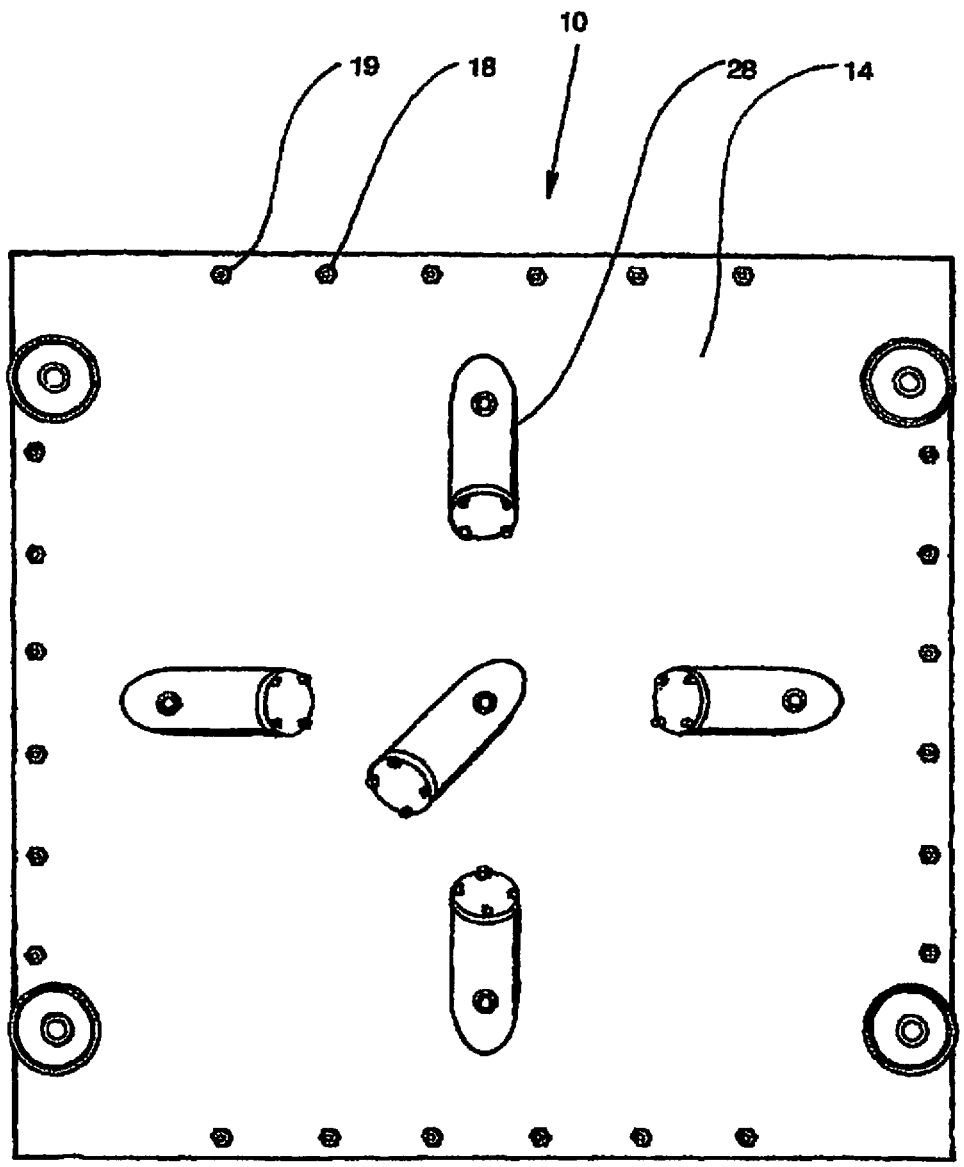
FIG. 9 is a bottom view of the embodiment of FIG. 7.

In one embodiment, shown in FIG. 1A, the vibration table 10' includes an insulating sheet or layer 20, preferably a ceramic material, is bonded on the top of upper plate 12'. A metal top plate formed of titanium or the like can be positioned on the top of the insulating sheet but is not essential in the present invention. An insulating sheet is generally employed, but there are some applications where an insulating sheet is not used. The table of FIG. 1A is illustrated as square, but the modification is applicable to the round table 10 of the present invention.

The insulating sheet and upper surface of plate 12 include a plurality of openings 36 and 24, respectively, spaced in a conventional pattern (typically a rectangular grid on four inch or 100 mm centers) over the top of the vibrator table. The openings in the upper plate are internally threaded. These openings are larger than in a conventional vibration table to accommodate novel inserts 26 of the present invention.

Vibrators 28 of conventional design are mounted on the underside of the lower plate. The vibrators can be of a pneumatic design, or of an electro-dynamic (ED) configuration. An ED vibrator is capable of generating vibrations up to 250 Gs RMS and 50-100 kHz. At least some of the vibrators are mounted at an angle with respect to the bottom plate and skewed in different directions in order to provide uniform multi-axis excitation. The vibrations generated in the x-, y- and z-axes defined on the upper surface of the vibration table 10 with a circular upper plate 12 will generally vary less than 5% over the surface of the round table surface according to the invention, and can vary as little as +/−3%. Bolts 44 extend upwardly through and into ends of vibrators 28 and into the lower plate to mount the vibrators securely to the bottom of lower plate 14.

The inserts 26 include an externally threaded shaft 30 with a head 32 on one end. The head can have a hexagonal shape. The inserts have internal threaded openings 34 therethrough. Inserts 26 extend through openings 36 in the insulator sheet 20 and then are threaded into internally threaded openings 24 in the upper plate. The inserts are threaded all the way into and preferably through the openings in the upper plate until the heads 32 of the inserts securely abut the insulator sheet 20. Desirably the insert shafts extend past the bottom of plate 12 (typically about ¼ inch).

Inserts 26 are mounted securely in threaded openings 24 in the upper plate. The inserts thus serve to provide a rigid extension of the upper plate above the insulator sheet. The torque applied to the inserts should be sufficient to snugly clamp the inserts to the upper plate. It is desired that the inserts be tightened in the openings 24 in the upper plate with a torque of approximately 120-130 foot pounds. The upper torque limit is set below the torque limit of the insert threads.

Inserts 26 in the preferred embodiment are ¾ by 1 inch stainless steel bolts with the head being 1¼ inch wide and about ¼ to ⅜ inches thick. In the exemplary embodiments, the insert bolts have 16 threads per inch, but this does not appear to be critical. Bolt diameter, however, is important. Smaller bolts of ⅜ inch diameter do not appear to transmit G forces as effectively. Bolt sizes greater than ⅜ inch should be used. The bolt diameter should be large enough so that there is a large enough thread contact area to transmit acceleration forces without substantial attenuation caused by the inserts. Bolt diameters larger than ¾ inch are generally less practical to produce and are not essential. The inserts are preferably locked in position by means of a bolt locking fluid or compound, such as a fluid sold under the brand name Locktite or the like.

With the inserts inserted as described, a test product may be mounted on the upper surface 48 of the insert by means of attachment bolts 50 that engage internal threaded openings 34 in the insert to attach the test product or a mounting fixture for the test product (both referred to by numeral 52) to the upper surface of the spacer. Some parts can be screwed directly to the table. Other parts require a mounting fixture. Attachment bolts 50 in the exemplary embodiment are ⅜ inch (10 mm) bolts. Bolts 50 can extend all the way through internal insert thread area. The extended thread area of the insert makes it possible to obtain a longer thread contact area with attachment bolt 50. This increased thread contact area improves the transmission of acceleration forces through the test part. The larger external diameter of the insert and the longer length of the internal threaded opening in insert and attachment bolt both are believed to contribute to the improved force transmission properties of the invention, such that the force transmission properties of the present invention are better than the force transmission properties of a conventional uninsulated aluminum plate where the test product is bolted directly to the plate with conventional ⅜ inch bolts.

There are a number of advantages to a shaker table constructed in this manner. The table is very rigid and responsive to vibration, such that acceleration forces of up to 120 Gs RMS or more can be transmitted to the table through the insert over a frequency range of up to about 10,000 Hz or more, with the vibration forces being distributed primarily over a range of about 1000-4000 Hz. A typical vibration table employing a comparable actuation force transmits vibrations of 70 Gs RMS or less, concentrated primarily in a frequency range of about 1000-3000 Hz. The new table also transmits substantially higher peak acceleration forces than prior vibration tables, and the forces are distributed more evenly over the concentrated frequency range.

Another advantage of the inserts of the present invention is that they space the test product or test product mounting fixture away from the insulation sheet on the upper plate. This makes it possible to maintain a more uniform temperature control around all the upper and lower surfaces of the test product. Test products are sometimes subjected to temperatures ranging from −100 to +200 C. In prior vibration tables, the product or its mounting fixture is mounted directly on the upper surface of the vibration table, where the upper surface prevents air flow under the test product and therefore produces different temperatures on the lower and upper side of the test product.

It should be understood that the foregoing is merely exemplary of the preferred practice of the present invention and that various changes in the details and arrangements of the embodiments disclosed herein may be made without departing from the spirit and scope of the present invention.

The invention claimed is:

1. An improved, light weight, rigid, multi-axis vibration table for maximizing high frequency and high energy vibration transmissions to test products mounted on the table while minimizing variations in the magnitude of the vibrations in each axis at different lateral points on the surface of the table, comprising:
   a rigid table top comprising a pair of vertically spaced upper and lower rigid metal plates that are circular in shape, the plates being separated by rigid spacers and rigidly fastened together by threaded fasteners, the upper plate having one or more spaced internally threaded openings therein for mounting one or more test products on the upper plate;
   a plurality of vibrators mounted at skewed angles on an underside of the table top, the vibrators generating simultaneous vibrations in the table top and the test products mounted thereon in x-, y- and z-axes relative to the plane of the upper surface,
   whereby the circular table top causes reduced variation in the magnitude of the vibrations in each of the respective x-, y- and z-axes at different lateral points on the upper surface of the table in comparison with a table top having a rectangular profile.

2. A vibration table as in claim 1 wherein the upper and lower plates are separated by edge spacers that are disposed around a central axis of the circular plates.

3. A vibration table as in claim 1 wherein the upper and lower plates are separated by spacers that are arcuate in shape and are disposed symmetrically around a central axis of the circular plates.

4. A vibration table as in claim 2 wherein the table further comprises a central spacer positioned between the upper and lower plates at the center of the plates and attached thereto by a threaded fastener extending between the plates and through the spacer.

5. A vibration table as in claim 1 wherein the upper and lower plates are rigidly attached together by threaded fasteners that are tightened to a torque of at least about thirty (30) foot pounds of torque.

6. A vibration table as in claim 1 wherein the table top comprises a plurality of annular inserts having externally threaded exterior surfaces thereon that engage mating internally threaded openings in the upper plate and are securely mounted therein, the inserts further having internally threaded openings therein, test products being attached to the inserts by threaded fasteners that engage the internally threaded openings in the inserts.

7. A vibration table as in claim 6 wherein the inserts comprise steel, and the internally threaded openings in the inserts and the threaded portion of the threaded fasteners that fit therein are longer than the thickness of the upper plate, so as to enhance the rigidity of the attachment of the test product to the vibration table relative to a table not employing inserts.

8. A vibration table as in claim 6 wherein at least some of the inserts comprise a threaded shaft having an enlarged head thereon that abuts the top of the upper plate of the table top, with the head having an outer surface that is formed so as to be engageable by a wrench, the insert being tightened into the table top at a torque of at least about 120 foot pounds, so as to maintain a rigid connection between the insert and the table top.

9. A vibration table as in claim 1 wherein the upper plate is an aluminum plate about one-half (½) inch thick.

10. A vibration table as in claim 1 and further comprising an insulating sheet bonded to the top of the upper layer.

11. A vibration table as in claim 10 wherein the insulating sheet is formed of a ceramic material.

12. A vibration table as in claim 11 and further comprising a metal top plate mounted over the ceramic material.

13. A vibration table as in claim 8 wherein the table comprises an insulating sheet formed of a ceramic material and at least some of the inserts comprise a threaded shaft having an enlarged head thereon that exerts downward pressure on the ceramic material on the upper plate of the table top surrounding the insert, with the insert being tightened into the table top at a torque of at least about 120 foot pounds.

14. A vibration table as in claim 9 wherein both the upper and lower plates comprise aluminum.

* * * * *